United States Patent [19]

Reed et al.

[11] 4,088,744

[45] May 9, 1978

[54] INCREASED PREHEATING OF SULFUR PLANT GASES

[75] Inventors: Robert L. Reed; John W. Palm; Ralph G. Ruth, all of Tulsa, Okla.

[73] Assignee: Standard Oil Company (Indiana), Chicago, Ill.

[21] Appl. No.: 788,478

[22] Filed: Apr. 18, 1977

[51] Int. Cl.² ............................................. C01B 17/04
[52] U.S. Cl. ............................ 423/573 G; 423/574 R; 23/262
[58] Field of Search ............... 423/224, 542, 573, 574, 423/576; 23/262, 277 C

[56] References Cited

U.S. PATENT DOCUMENTS

| | | | |
|---|---|---|---|
| 1,893,051 | 1/1933 | Dow | 423/DIG. 6 |
| 2,386,202 | 10/1945 | Fernelius et al. | 423/573 |
| 2,403,451 | 7/1946 | Nevins et al. | 423/573 |
| 2,685,343 | 8/1954 | Permann | 423/224 |
| 3,860,679 | 1/1975 | Palm | 423/576 |

FOREIGN PATENT DOCUMENTS 5,959 of 1883 United Kingdom ................. 423/573

OTHER PUBLICATIONS

Lauer; *Chemical Engineering Techniques*", Reinhold Pub. Corp., N.Y., 1952; pp. 220–222.

*Primary Examiner*—G. O. Peters
*Attorney, Agent, or Firm*—Robert B. Stevenson; Arthur McIlroy

[57] ABSTRACT

Claus-type processes used in the past to recover sulfur from low $H_2S$ acid gas, in the presence of hydrocarbon or other impurities which are harmful to the Claus catalyst, have required the use of straight-through operation with the burning of supplemental fuel gas to maintain the required combustion temperature in the furnace. A method for conserving the amount of additional fuel gas required involving utilization of the excess heat of combustion to preheat the acid gas and oxygen-containing streams to a temperature in excess of 600° F prior to combustion is described. Additional energy savings are achieved by preheating the Claus tail gas effluent prior to incineration.

4 Claims, 1 Drawing Figure

U.S.Patent May 9, 1978 4,088,744
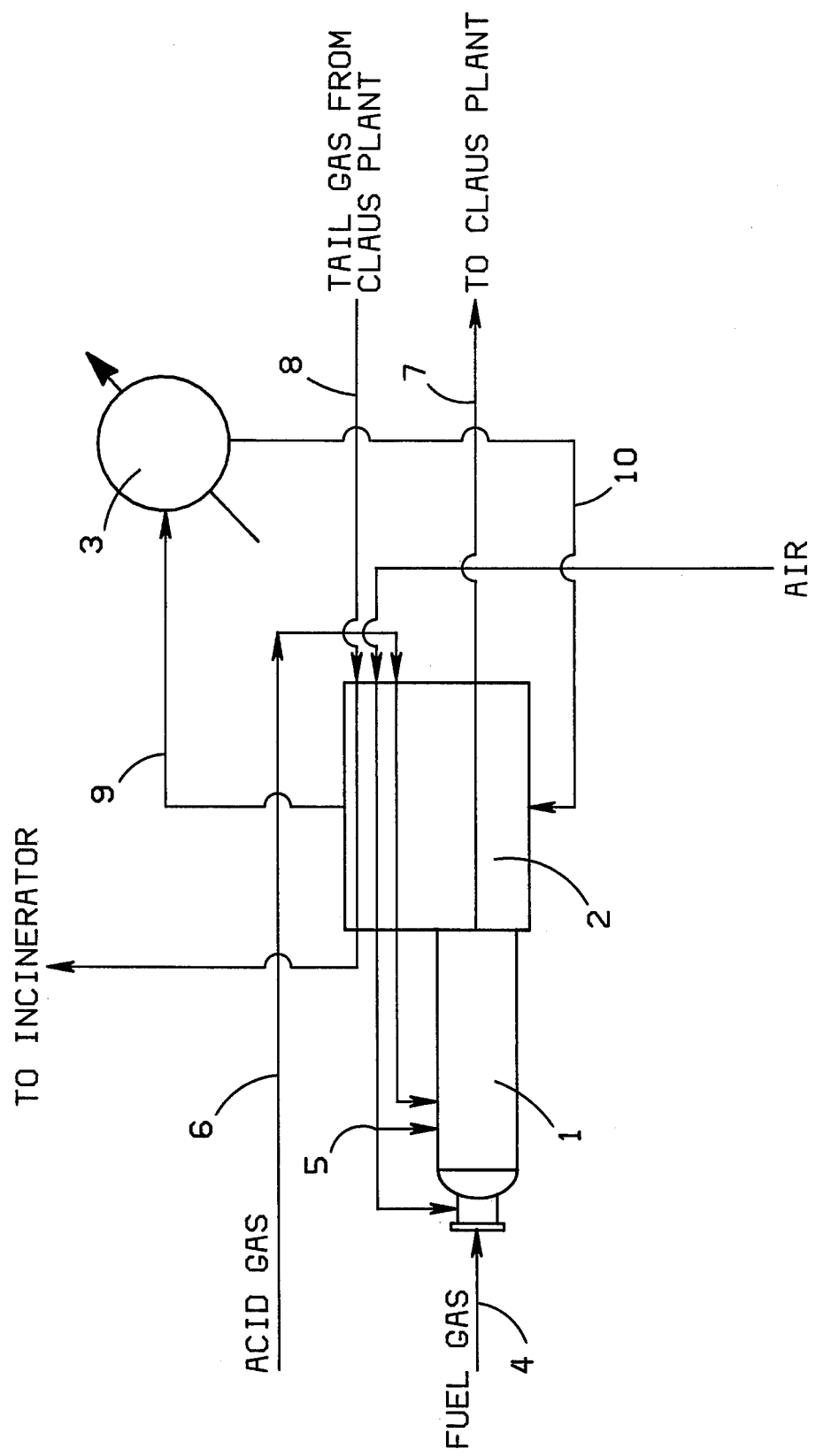

INCREASED PREHEATING OF SULFUR PLANT GASES

BACKGROUND OF THE INVENTION

1. Field of the Invention

The present invention relates to the catalytic conversion of $H_2S$ and $SO_2$ mixtures into free sulfur. More specifically, it is concerned with the efficient removal of sulfur from a relatively low $H_2S$-containing gas stream, e.g., 45 mole percent or less, containing hydrocarbon or other contaminants which are harmful to the Claus catalyst, being accomplished in a so-called straight-through Claus-type catalytic sulfur recovery process wherein additional fuel gas is used to maintain adequate combustion temperature in the combustion furnace. In particular, it deals with an improved method of utilizing excess heat of combustion produced in the straight-through furnace to reduce the amount of additional fuel gas consumed, thus leading to a more energy efficient process.

In the process disclosed in U.S. Pat. No. 3,860,697 an acid gas containing less than 45 mole percent $H_2$ is processed through a straight-through-type furnace wherein the proper furnace temperature and flame stability is achieved by adding supplementary fuel gas with or without a portion of the acid gas stream along with the air or oxygen to a first combustion zone which is then followed by a second combustion zone which processes all of the acid gas stream. The present invention is specifically related to this process and is viewed as an improvement thereof. As such, the enabling disclosure aspects of U.S. Pat. No. 3,860,697 are here incorporated by reference.

SUMMARY OF THE INVENTION

As originally contemplated, the process of U.S. Pat. No. 3,860,697 requires significant amounts of fuel gas being added to the furnace in order to supply sufficient energy to achieve the desired combustion temperature and stable flame conditions. For example, a typical plant processing a feed stream which is preheated to about 400° F would require 4–6 moles of a fuel gas with a heating value of 1045 BTU/cu ft for every 100 moles of feed gas containing 25 moles $H_2S$ being processed. For a plant with a sulfur production of 100 LT/D, the fuel gas rate (at 1000 BTU/cu ft) would be about 800 MSCF/D. Although in the past such fuel consumption rates could have been considered reasonable, presently the fuel can be assumed to have a value of at least $1200/day or $12/long ton of sulfur produced.

In view of the excessive fuel requirements of the previous method, we have discovered an improvement in that process which leads to significant reductions in the quantity of supplemental fuel being consumed. The improvement involves utilizing the excess heat of combustion to preheat the feed stream and oxygen containing stream prior to entry into the combustion zones to a temperature in excess of 600° F. Further fuel gas savings are achieved by preheating the Claus tail gas to a similar temperature prior to incineration. The preheating of the respective streams is conveniently achieved by passing the appropriate streams through tubular sections in the waste heat boiler or other heat exchange equipment directly downstream from the furnace. In performing our invention the waste heat boiler is modified in that nonreactive stainless steel materials or the equivalent are employed where hot sulfur gases are present and the water used in the boiler is replaced with a higher boiling temperature reflux medium or its equivalent.

BRIEF DESCRIPTION OF THE DRAWING

The drawing is a simplified flow diagram illustrating how the basic improvement of this invention is incorporated into a preferred embodiment involving a known straight-through Claus muffle furnace and waste heat boiler.

DESCRIPTION OF THE PREFERRED EMBODIMENT

The improved method for efficient operation of a Claus-type sulfur recovery process according to the present invention and how this improvement is incorporated into a straight-through Claus furnace can be best explained and understood by reference to the accompanying drawing.

As illustrated in the drawing, a straight-through muffle furnace 1, such as described in U.S. Pat. No. 3,860,697, is directly connected to waste heat boiler 2. During operation, the fuel gas and a portion of the air enter the left portion of the furnace (via lines 4 and 5, respectively), traveling from left to right. The acid gas stream containing the $H_2S$ and hydrocarbon contaminant enters the same furnace 1, via line 6, somewhat further down the furnace along with the remaining portion of the air as taught in U.S. Pat. No. 3,860,697. The resulting combustion products exit the furnace and pass through a tubular section of the waste heat boiler 2 as symbolically indicated by line 7. The effluent from the waste heat boiler is then directed via line 7 to the Claus plant for further catalytic removal of sulfur as known in the art.

The preheating of the air or oxygen containing stream, the acid gas stream, and the Claus plant tail gas stream is accomplished by directing the contents of lines 5, 6, and 8, respectively, through tubular sections of the waste heat boiler. As illustrated, their direction of flow in the tubular sections is from right to left above the furnace effluent line 7. The hot Claus plant tail gas of line 8 is sent to the incinerator while the hot air and acid gas are delivered to the furnace as previously indicated. To complete the simplified flow diagram, hot refluxing vapors are removed from the top of the waste heat boiler 2 via line 9 and are cooled in condenser 3. The heat of condensation available in condenser 3 may be used for heating other streams from the Claus plant, or from elsewhere, if desired. The cooled condensate stream is then returned from condenser 3 via line 10 to the waste heat boiler 2. The fluid level within the waste heat boiler 2 is maintained such that line 7 is immersed in liquid while lines 5, 6, and 8 are in contact with vapors. In this manner, the excess heat of combustion is used to boil the refluxing medium and the vapor temperature establishes the upper limit to the preheating of the respective gas streams.

In order to achieve a significant reduction in the amount of supplemental fuel gas consumed, the acid gas and air should be preheated to a temperature in excess of 600° F. An additional fuel gas saving can be achieved by preheating the tail gas from the Claus plant to a similar temperature prior to incineration. Generally, temperatures in excess of about 700° F to 750° F require the selection of more expensive materials but higher temperatures are feasible. This is of importance with respect to the shell of the waste heat boiler as well as the tubes within the waste heat boiler that contain corrosive sulfur gases. The temperature range of about 640° F to about 670° F is the preferred range in that it represents a significant efficiency optimization well within commercially available material specifications and reflux mediums. At these temperatures, sulfur gas-resistant grades of stainless steel or the like are the preferred materials for construction of the waste heat boiler tubes, while less expensive carbon steel material can be used for the shell side of the boiler.

Heretofore, it has been customary to use boiling water or boiling aqueous solutions in waste heat boiler 2 as a heat transfer medium. Because of the high temperature employed in our method, the use of water or aqueous solutions as a heat transfer medium is impractical. At temperatures in excess of 600° F, the additional expense associated with handling the resulting high pressure steam offsets the savings associated with the reduction of fuel gas consumption. For example, at 545° F the waste heat boiler and ancillary equipment must withstand pressures of 1000 psi while 670° F requires 2500 psi. In employing the method of our invention, either one of two types of apparatus may be used. The first type would retain a boiler apparatus as used heretofore, but employ a boiling medium with a lower vapor pressure than that of liquid water. The second type of apparatus would use a nonboiling type of fluid heat transfer medium to remove the heat from the tubes which convey furnace effluent 7 and transfer it to the tubes which convey streams 5, 6, and 8.

A eutectic mixture containing 26.5 weight percent diphenyl and 73.5 weight percent diphenyl oxide (commercially available under the trademark "Dowtherm A") is ideal for use as a boiling heat transfer medium in the first type of apparatus. At a temperature of 670° F its vapor pressure is 84 pounds per square inch absolute. Examples of nonboiling heat transfer media which can be used in the second type of apparatus include molten salts, molten metals, or various organic materials which have a high boiling point.

The first type of heat transfer apparatus which uses a boiling heat transfer medium is generally preferred, because the agitation of boiling enhances the heat transfer rate, resulting in benefits which are obvious to those skilled in the art.

The basic concept of this invention is considered to be consistent with any contemporary sulfur recovery process which employs a supplementary fuel gas in the furnace in order to sustain a stable flame and achieve a combustion temperature of the order of about 2000° F or higher. As such, the preferred configuration illustrated in the drawing should not be considered unduly limiting. The advantages of this improved process are of particular importance when treating commercial scale acid gas streams of less than about 20 mole percent $H_2S$.

The following table of data illustrates the advantages which can be expected when the improvement of our invention is employed in a commercial scale plant producing 20 LT/D of sulfur from 2230 MSCFD of acid gas which has an anticipated $H_2S$ content of 26 mole percent and 0.9 mole percent hydrocarbon contaminants.

TABLE

|  | Case I Preheat 400° F | Case II Preheat 640° F | Difference (Savings) |
|---|---|---|---|
| Supplemental Fuel Gas rate, MSCF/Day | | | |
| Furnace | 87 | 42 | |
| Incinerator | 140 | 72 | |
| Total | 227 | 114 | 113 |
| Value at $1.50/MSCF | | | $170/day |

Case I is characteristic of what has been suggested in the past in terms of preheating. As such, it is presented for comparison to Case II, which represents the present improved process. As indicated, approximately a 50 percent reduction in supplemental fuel gas consumption can be anticipated. This amounts to a saving of $170 per day, or about $62,000 per year.

The cases in the table apply to an operation in which enough preheating and fuel gas burning are supplied to result in an effluent temperature from furnace 1 of about 2000° F with a feed acid gas in line 6 containing about 3 moles of hydrocarbons, expressed as equivalent methane, per 100 moles of hydrogen sulfide. Sometimes the acid gas has a much higher hydrocarbon content, for example, 20 moles or more of hydrocarbons, expressed as equivalent methane, per 100 moles of hydrogen sulfide. With such a higher hydrocarbon content, a higher effluent temperature in furnace 1 is required, such as about 2100°–2200° F, for complete combustion of the hydrocarbons and to minimize the conversion of hydrogen sulfide to carbon sulfides which may form. In other cases, notably in crude oil refineries and in coal gasification processes, the acid gas in line 6 may contain nitrogen compounds such as ammonia which, depending on its concentration, may require temperatures as high as 2300°–2800° F for satisfactory combustion. For these situations where the effluent temperature from furnace 1 must be maintained at 2100°–2800° F, the savings in fuel consumption may be considerably greater than shown in the table.

The amount of fuel gas required is influenced by the hydrogen sulfide concentration of the acid gas. For example, with a hydrogen sulfide concentration of 12 mole percent, the savings in fuel gas requirement expected when the improvement of our invention is used in a plant producing 20 long tons per day of sulfur from 4826 MSCFD of acid gas is 252 MSCFD or $378/day at an assumed value of $1.50 per 1000 std. cu ft.

Various types of fuel gases may be used in our improvement. One example is a hydrocarbon-type fuel gas. Another example is a hydrogen-rich fuel gas which is sometimes available.

Having thus described the preferred embodiment, it should be readily apparent that the preheating step does not have to be performed within a waste heat boiler, but could involve additional preheat heat exchangers external to the boiler with the reflux medium or its equivalent supplying the heat. Further, the process is compatible with an additional contemporary sulfur recovery process which further reduces the Claus tail gas sulfur content prior to incineration; these tail gas treating processes are generally of three types which may be referred to as reducing type, oxidizing type, and extended Claus type. Additional modifications and variations consistent with contemporary sulfur recovery technology should be obvious to those skilled in the art and as such are within the contemplated scope of our improvement.

We claim:

1. In a process for the catalytic recovery of free sulfur from a feed stream containing less than 45 mole percent hydrogen sulfide and contaminated with hydrocarbons or other harmful contaminants wherein all of said feed stream and an oxygen-containing stream is first passed through a combustion zone at a temperature sufficiently high to insure the burning of said contaminants and wherein the temperature of the flame in said combustion zone is maintained by addition of fuel gas and wherein the hot combustion products are cooled prior to Claus-type catalytic sulfur recovery as commonly known to the art by passing said combustion products through the tube side of a tube and shell waste heat removal apparatus containing a liquid/vapor heat transfer medium in the shell side, the specific improvement comprising:

passing said feed stream and the oxygen-containing stream through the tube side of said waste heat removal apparatus wherein said heat transfer medium in the shell side is selected such that it boils at a temperature in excess of 600° F, thus utilizing the excess heat of combustion by preheating said feed stream and said oxygen-containing stream prior to entry into said combustion zone to a temperature in excess of at least 600° F thereby conserving the amount of fuel gas required in said combustion zone.

2. A process of claim 1 including passing the Claus tail gas through the tube side of said waste heat removal apparatus, thus utilizing said excess heat of combustion to preheat the effluent tail gas from said Claus-type sulfur recovery prior to incineration to a temperature in excess of at least 600° F and conserving the amount of fuel gas required in said incineration.

3. A process of claim 2 wherein said preheating is performed within said waste heat removal apparatus using a liquid that boils between about 600° F and about 750° F.

4. A process of claim 3 wherein said boiling liquid is a entectic mixture containing 26.5 weight percent diphenyl and 73.5 weight percent diphenyl oxide.

* * * * *

UNITED STATES PATENT OFFICE
CERTIFICATE OF CORRECTION

PATENT NO. : 4,088,744
DATED : May 9, 1978
INVENTOR(S) : Robert L. Reed; John W. Palm and Ralph G. Ruth It is certified that error appears in the above-identified patent and that said Letters Patent are hereby corrected as shown below:

Column 1, line 23, "$H_2$" should read --$H_2S$--.

Signed and Sealed this

Second Day of January 1979

[SEAL]

Attest:

RUTH C. MASON
Attesting Officer

DONALD W. BANNER
Commissioner of Patents and Trademarks